United States Patent
Chang et al.

(10) Patent No.: US 8,422,253 B2
(45) Date of Patent: Apr. 16, 2013

(54) CIRCUIT REGULATOR AND SYNCHRONOUS TIMING PULSE GENERATION CIRCUIT THEREOF

(75) Inventors: Lon-Kou Chang, Hsinchu (TW); Chang-Yu Wu, Hsinchu (TW); Hsing-Fu Liu, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 203 days.

(21) Appl. No.: 12/970,029

(22) Filed: Dec. 16, 2010

(65) Prior Publication Data
US 2012/0033459 A1    Feb. 9, 2012

(30) Foreign Application Priority Data

Aug. 4, 2010 (TW) .............................. 99125990 A (51) Int. Cl.
*H02M 3/335* (2006.01)
(52) U.S. Cl.
USPC ................... 363/21.18; 363/21.13; 363/21.16
(58) Field of Classification Search ........... 363/19, 363/21.01, 21.05, 21.06, 21.07, 21.09, 21.1, 363/21.12, 21.13, 21.14, 21.18
See application file for complete search history.

(56) References Cited

U.S. PATENT DOCUMENTS

| | | | | |
|---|---|---|---|---|
| 4,870,555 A | * | 9/1989 | White | 363/21.06 |
| 6,836,415 B1 | * | 12/2004 | Yang et al. | 363/21.01 |
| 7,599,198 B2 | * | 10/2009 | Tao et al. | 363/17 |
| 2008/0062725 A1 | * | 3/2008 | Yang | 363/21.1 |

* cited by examiner

*Primary Examiner* — Gary L Laxton
*Assistant Examiner* — Alex Torres-Rivera
(74) *Attorney, Agent, or Firm* — Morris Manning & Martin LLP; Tim Tingkang Xia, Esq.

(57) ABSTRACT

A circuit regulator is used to generate a pulse-width-modulation signal, so as to control a power to be selectively input or not input to a primary side of a switching power supply. The circuit regulator includes a synchronous timing pulse generation circuit, outputs a starting pulse after performing signal process of time delay, timing pulse regulation, and synchronization control on a pulse-width-modulation signal and a discharging time signal of a secondary side, and accordingly effectively controls a pulse starting time of the pulse-width-modulation signal. Therefore, the synchronous timing pulse generation circuit can be applied to the circuit regulator, so as to further effectively prevent an inductor current of the switching power supply from entering a Continuous Conduction Mode (CCM).

11 Claims, 14 Drawing Sheets

CIRCUIT REGULATOR AND SYNCHRONOUS TIMING PULSE GENERATION CIRCUIT THEREOF

CROSS-REFERENCE TO RELATED APPLICATIONS

This non-provisional application claims priority under 35 U.S.C. §119(a) on Patent Application No(s). 099125990 filed in Taiwan, R.O.C. on Aug. 4, 2010, the entire contents of which are hereby incorporated by reference.

BACKGROUND OF THE INVENTION

1. Field of the Invention

The present invention relates to a circuit regulator and a synchronous timing pulse generation circuit thereof, and more particularly to a circuit regulator and a synchronous timing pulse generation circuit thereof, capable of synchronously controlling a pulse starting time of a pulse-width-modulation signal, and preventing an inductor current from entering a Continuous Conduction Mode (CCM).

2. Related Art

Now, power supplies are not only required to provide stable output voltages and output currents for various electronic devices, but also required to satisfy the requirements of electronic devices on safety regulations. According to the design techniques, power supplies can be categorized into linear power supplies and switching power supplies. However, the linear power supply needs large and heavy isolation transformers and also large capacitors for regulation, which results in problems of larger volume and heavier weight. A worse part is that the linear power supply has excessively low conversion efficiency. Hence, at a practical application level, as compared with the linear power supply, a switching power supply formed by smaller power electronic switches, a lighter isolation transformer, a smaller capacitor, and a diode has better industrial applicability and is mostly used.

Generally, a working frequency of the switching power supply is between 20 KHz and 100 KHz. If it is used in cooperation with a Zero Voltage Switching (ZVS), a switching frequency can be further increased to be higher than 200 KHz, so as to obtain smaller and lighter design with higher power transfer efficiency and even high power factor in AC/DC applications.

Figure 1:
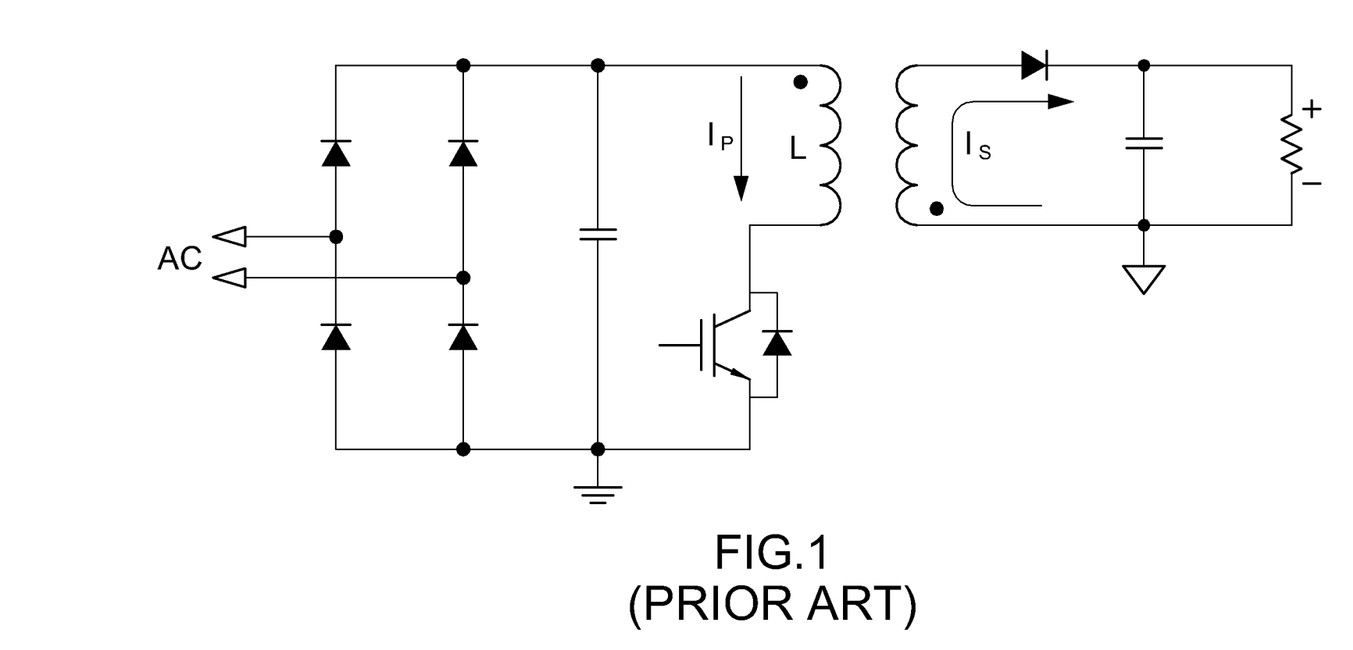
FIG. 1 is a brief circuit architectural view of a conventional switching power supply.

However, the switching power supply has more complex operation modes. While an unexpected operation happens, the circuit may enter an unexpected operation mode and let the converter fail to keep output current constant. For example, FIG. 1 is a brief circuit architecture view of a conventional switching power supply. When the switching power supply transfers the power from a primary side to a secondary side by performing the charging and discharging processes of magnetic core of the isolation transformer through the magnetic inductor L, the switching power supply generates a primary side switching current $I_p$ and a secondary side switching current $I_s$ respectively at two sides of the transformer. When the primary side switching current $I_p$ enters a CCM on the inductor L under improper control, it is very easy to result in successive accumulation of the inductor current in the charging and discharging processes of the transformer, so as to cause a problem of magnetic core saturation. In this situation, the core power loss will increase. This may also cause high switching current and higher switching loss of switching transistor and diodes. Consequently, additional power consumption of the switching power supply will be cost. Particularly, it is more difficult for the converter using primary side control to obtain an accurate and stable constant output current when undergoing the CCM.

SUMMARY OF THE INVENTION

In view of the foregoing, the present invention is a multipurpose synchronous timing pulse generation circuit which can be applicable to switching power supplies for improving the performance of the converter. The synchronous timing pulse generation circuit controls pulse starting time of the pulse-width-modulation signal after performing certain signal process including time delay, timing pulse regulation, and pulse-width-modulation signal synchronization control triggered by both of the discharging time signal of the secondary side and the timing pulse signal. Besides, through the circuit regulator and the synchronous timing pulse generation circuit thereof, an inductor current of the switching power supply is effectively prevented from entering a CCM.

The present invention provides a synchronous timing pulse generation circuit, applicable to a switching power supply which uses a pulse-width-modulation signal to determine the conducting time of power switch. In such application, the switching power supply has a primary side and a secondary side, and the switching power supply enables a power to be selectively input or not input to the primary side through the pulse-width-modulation signal. The synchronous timing pulse generation circuit is used to generate a starting pulse of the pulse-width-modulation signal, and the synchronous timing pulse generation circuit comprises a time delay unit, a timing pulse regulation unit, and a synchronous control unit.

The time delay unit outputs a control signal after delaying the starting pulse for a predetermined time. The timing pulse regulation unit enables a constant current source to selectively charge the timing pulse regulation unit according to the control signal, and accordingly outputs a timing pulse signal. The synchronization control unit outputs the starting pulse according to a discharging time signal of the secondary side and the timing pulse signal. By detecting a rising edge of the timing pulse signal and a falling edge of the discharging time signal, a triggering time of the starting pulse is synchronized to one occurring later of the rising edge of the timing pulse signal and the falling edge of the discharging time signal in the same period, and the starting pulse is used to determine a pulse starting time of the pulse-width-modulation signal.

A circuit regulator is applicable to a switching power supply, wherein the switching power supply has a primary side and a secondary side, and the switching power supply enables a power to be selectively input or not input to the primary side through a pulse-width-modulation signal. The circuit regulator comprises a pulse-width-modulation signal generation circuit and a synchronous timing pulse generation circuit.

The pulse-width-modulation signal generation circuit outputs the pulse-width-modulation signal according to a primary side switching current signal of the primary side and a discharging time signal of the secondary side. The pulse-width-modulation signal has a starting pulse. The synchronous timing pulse generation circuit outputs the starting pulse after performing signal process of time delay, timing pulse regulation, and synchronization control on the pulse-width-modulation signal and the discharging time signal. The starting pulse is used to determine a pulse starting time of the pulse-width-modulation signal.

Thus, the circuit regulator and the synchronous timing pulse generation circuit thereof according to the present invention is applied to the switching power supply, such that the pulse starting time of the pulse-width-modulation signal is determined by both the discharging time signal of the secondary side and the timing pulse signal. Through the circuit regulator and the synchronous timing pulse generation circuit thereof according to the present invention, the inductor current of the switching power supply is prevented from entering the CCM.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 2A:
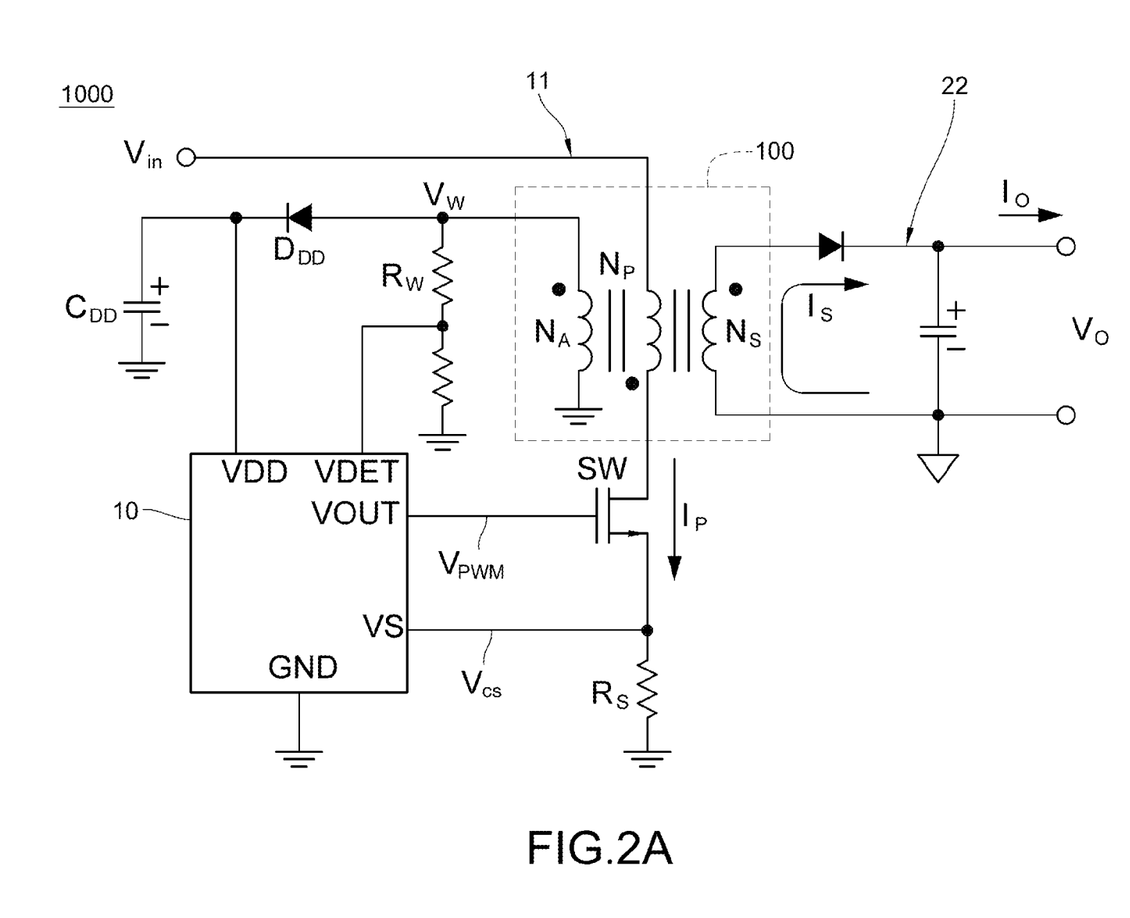
FIG. 2A is a schematic view of an application architecture of a synchronous timing pulse generation circuit applied to a Primary Side Regulator (PSR) according to an embodiment of the present invention.
Figure 2B:
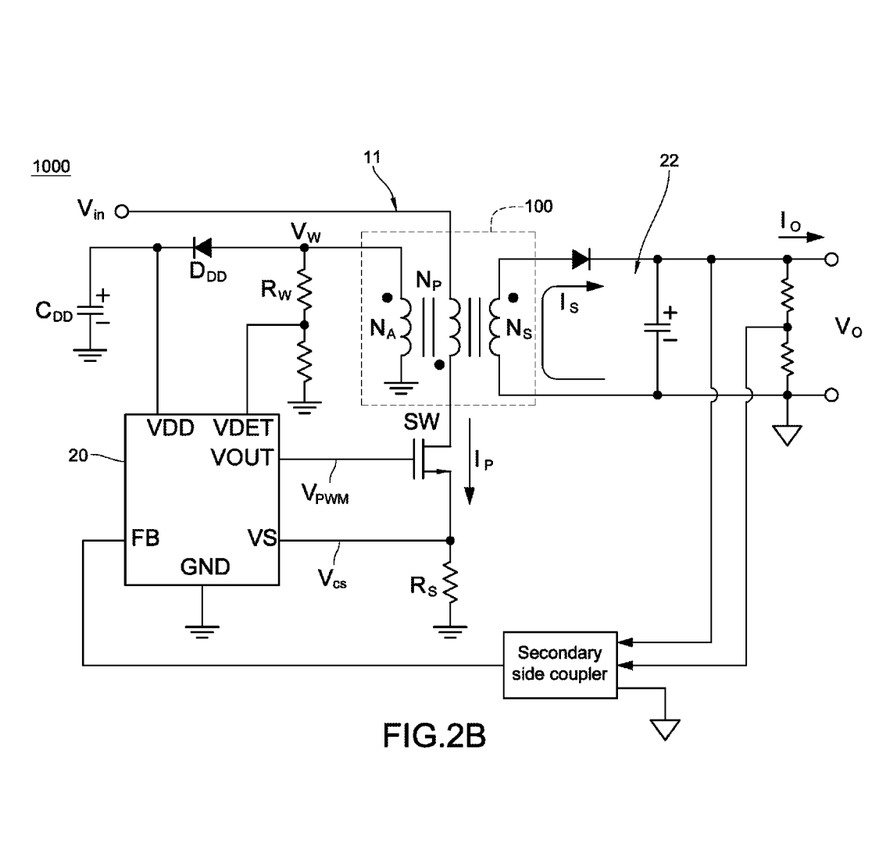
FIG. 2B is a schematic view of an application architecture of a synchronous timing pulse generation circuit applied to a Secondary Side Regulator (SSR) under constant voltage control according to an embodiment of the present invention.
Figure 2C:
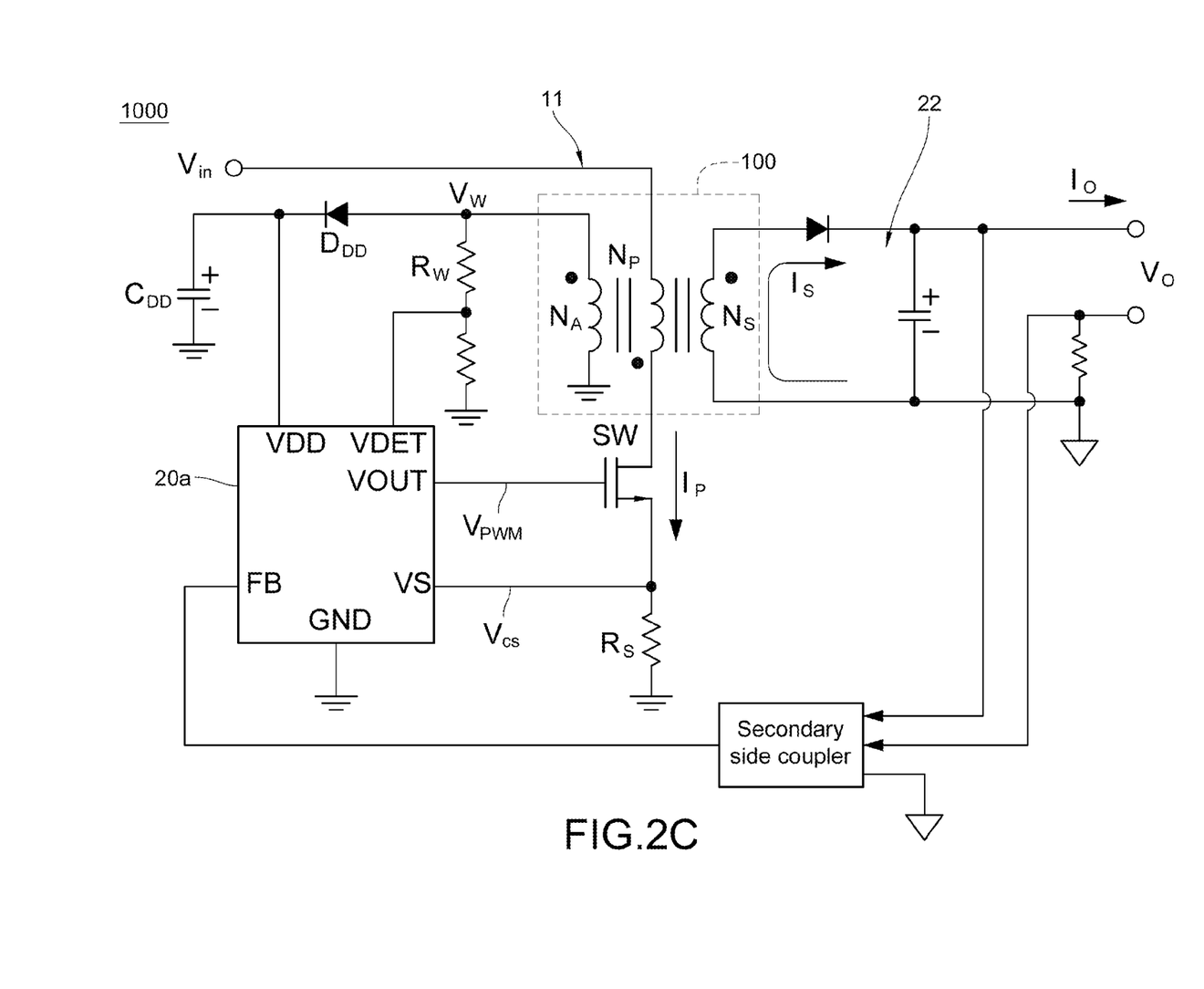
FIG. 2C is a schematic view of an application architecture of a synchronous timing pulse generation circuit applied to a Secondary Side Regulator (SSR) under constant current control according to an embodiment of the present invention.

FIGS. 2A to 2C are respectively schematic views of application architectures of a synchronous timing pulse generation circuit according to an embodiment of the present invention. The synchronous timing pulse generation circuit according to an embodiment of the present invention can be applied to a primary side 11 or a secondary side 22 of a switching power supply 1000. In FIG. 2A, the synchronous timing pulse generation circuit is applied to a Primary Side Regulator (PSR) 10. In FIGS. 2B and 2C, the synchronous timing pulse generation circuit is respectively applied to an Secondary Side Regulator (SSR) 20 under constant voltage control and to an SSR 20a under constant current control.

The switching power supply 1000 can be, but is not limited to, a flyback converter, a forward converter, a half-bridge converter, a full-bridge converter, or a push-pull converter.

In the following implementation manner, the synchronous timing pulse generation circuit applied to the PSR 10 is used as an illustration for an embodiment, and is not used to limit the scope of the present invention.

The PSR 10 is disposed at the primary side 11 of the switching power supply 1000, and the switching power supply 1000 has an output voltage $V_o$, an output current $I_o$, and an input voltage $V_{in}$.

A transformer 100 comprises an auxiliary winding $N_A$, a primary side winding $N_P$, and a secondary side winding $N_S$. The primary side 11 is commonly grounded at a grounding terminal of the input voltage $V_{in}$, while the secondary side 22 is commonly grounded at a grounding terminal of the output voltage $V_o$.

The PSR 10 has a power source supply terminal VDD, a grounding terminal GND, an output terminal VOUT, a discharging time detection terminal VDET, and a switching current sensing terminal VS. The PSR 10 can detect a reflected voltage $V_W$ through the discharging time detection terminal VDET, a primary side switching current signal $V_{cs}$ corresponding to a primary side switching current $I_P$ through the switching current sensing terminal VS, and accordingly output a pulse-width-modulation signal $V_{PWM}$.

The pulse-width-modulation signal $V_{PWM}$ is connected to a gate of a transistor SW through the output terminal VOUT. Hence, the PSR 10 can switch the transistor SW through the pulse-width-modulation signal $V_{PWM}$, so as to control a power to be input or not input to the primary side 11. The primary side switching current signal $V_{CS}$ can be a magnetizing current signal. The reflected voltage $V_W$ can charge a capacitor $C_{DD}$ through a rectifier $D_{DD}$ and provide energy to the PSR 10.

Figure 3A:
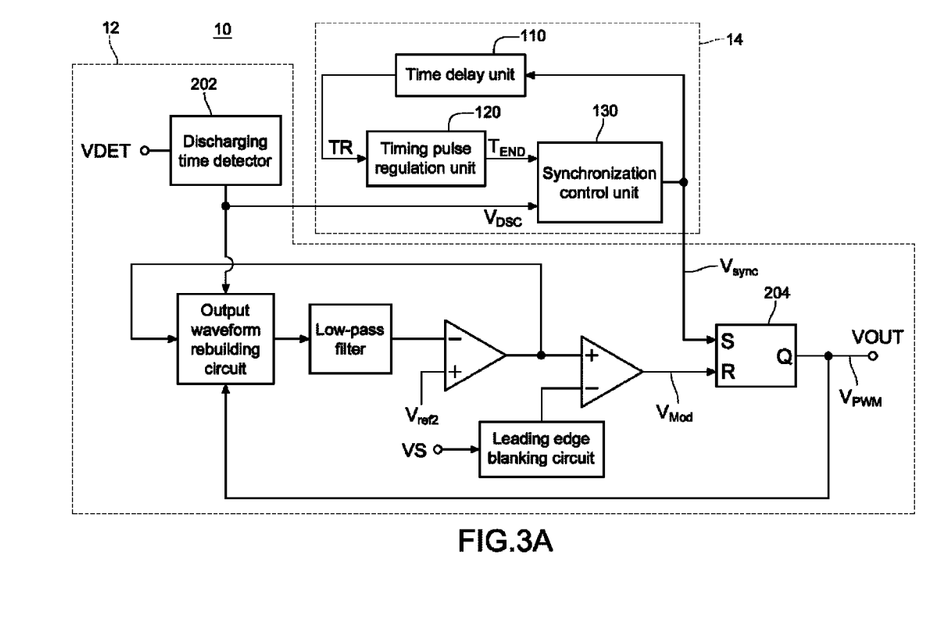
FIG. 3A is a circuit block diagram of a PSR according to an embodiment of the present invention.

FIG. 3A is a circuit block diagram of a PSR according to an embodiment of the present invention. The PSR 10 comprises a pulse-width-modulation signal generation circuit 12 and a synchronous timing pulse generation circuit 14. Two input terminals of the pulse-width-modulation signal generation circuit 12 are connected to the discharging time detection terminal VDET and the switching current sensing terminal VS of PSR 10 respectively. Referring to FIGS. 2A and 3A, the reflected voltage $V_W$ can be detected through the discharging time detection terminal VDET, and the reflected voltage $V_W$ is in response to a secondary side switching current $I_s$. The reflected voltage $V_W$ will drop sharply when the secondary side switching current Is drops to zero. Thus, the pulse-width-modulation signal generation circuit 12 can detect the reflected voltage $V_W$ through a discharging time detector 202 connected to the discharging time detection terminal VDET, and accordingly output a discharging time signal $V_{DSC}$ corresponding to the secondary side switching current $I_S$.

When energy stored in the transformer 100 is released to the secondary side 22, the discharging time signal $V_{DSC}$ is at a high level. Once release of the energy stored in the transformer 100 is accomplished (that is, the secondary side switching current $I_S$ drops to zero), the discharging time signal $V_{DSC}$ is at a low level.

Figure 3B:
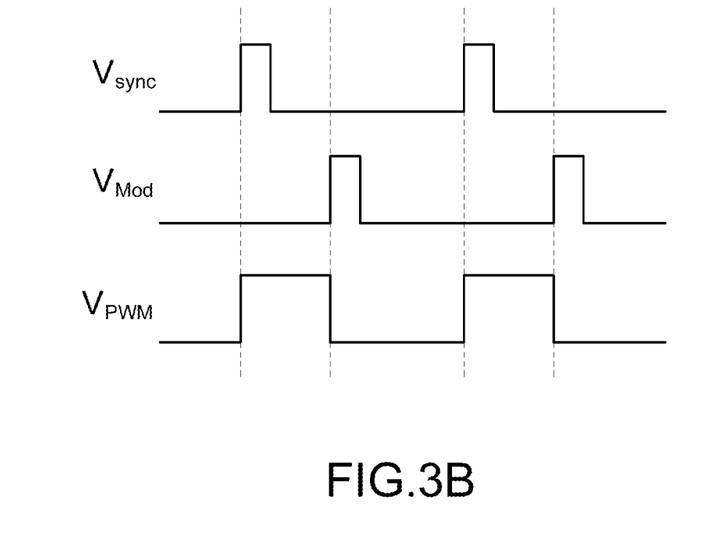
FIG. 3B is a relative timing diagram of a starting pulse, an adjusted signal, and a pulse-width-modulation signal according to an embodiment of the present invention.

As shown in FIG. 3A, the pulse-width-modulation signal generation circuit 12 firstly outputs an adjusted signal $V_{Mod}$ after performing signal process of an output waveform rebuilding circuit, a filter, an amplifier, and a comparator on the discharging time signal $V_{DSC}$, the primary side switching current signal $V_{cs}$, and a critical voltage $V_{ref2}$. And then, further according to a starting pulse $V_{sync}$ from the synchronous timing pulse generation circuit 14, the pulse-width-modulation signal $V_{PWM}$ is output through an SR flip-flop 204. Taking FIG. 3B as an example, the starting pulse $V_{sync}$ is used to determine the time when the pulse-width-modulation signal $V_{PWM}$ is switched to a high level, while the adjusted signal $V_{Mod}$ is used to determine the time when the pulse-width-modulation signal $V_{PWM}$ is switched to a low level.

The synchronous timing pulse generation circuit 14 is used to output the starting pulse $V_{sync}$ of the pulse-width-modulation signal $V_{PWM}$, and the synchronous timing pulse generation circuit 14 comprises a time delay unit 110, a timing pulse regulation unit 120, and a synchronization control unit 130. The time delay unit 110 receives the starting pulse $V_{sync}$, and outputs a control signal TR after delaying the starting pulse $V_{sync}$ for a predetermined time. A time period of the predetermined time can be designed depending on a practical circuit specification. For example, the predetermined time can be 50 ns to 100 ns, or may be set to be larger than a hold time of the SR flip-flop 204.

Figure 4:
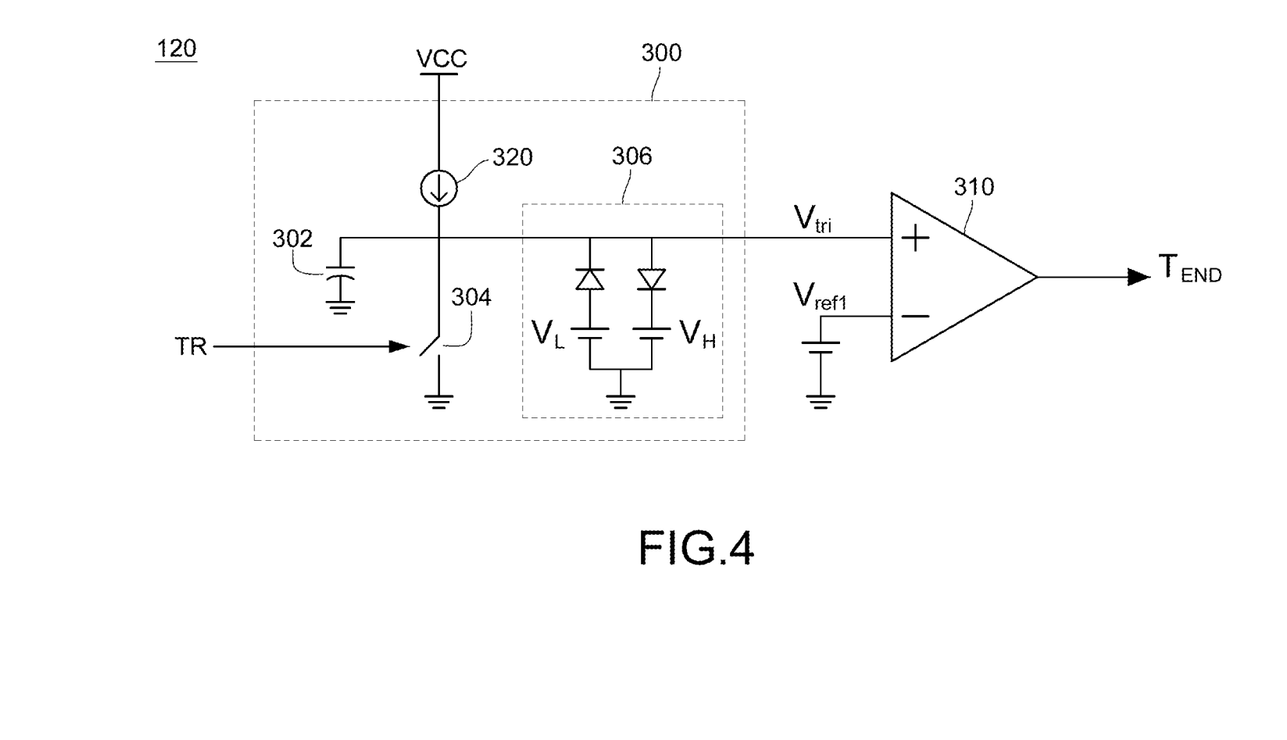
FIG. 4 is an internal circuit arrangement diagram of a timing pulse regulation unit according to an embodiment of the present invention.

The timing pulse regulation unit 120 outputs a timing pulse signal $T_{END}$ according to the control signal TR. FIG. 4 is an internal circuit arrangement diagram of a timing pulse regulation unit according to an embodiment of the present invention. The timing pulse regulation unit 120 comprises a charging and discharging circuit 300 and a comparator 310. The charging and discharging circuit 300 comprises a capacitor 302, a switch element 304, a level limiting circuit 306, and a constant current source 320.

The control signal TR can be used to control ON or OFF of the switch element 304. For example, when the control signal TR is at a low level and turns off the switch element 304, the circuit 300 can charge the capacitor 302 through the constant current source 320 connected to a power source VCC. While the control signal TR is at a high level (the switch element 304 is ON), the capacitor 302 can be discharged through the switch element 304 connected to ground. The level limiting circuit 306 can limit a voltage signal to a high level voltage value $V_H$ after the charging process, and limit the voltage signal to a low level voltage value $V_L$ after the discharging process respectively (that is, a level value of the voltage signal is limited between the highest voltage value $V_H$ and the lowest voltage value $V_L$), and accordingly output an indication signal $V_{tri}$. A timing waveform diagram of the indication signal $V_{tri}$ is shown as in FIG. 5A, and the level limiting circuit 306 is not limited to what is shown in FIG. 4, in which the high level voltage value $V_H$ and the low level voltage value $V_L$ are limited by two back-to-back connected diodes.

Figures 5A, 5B:
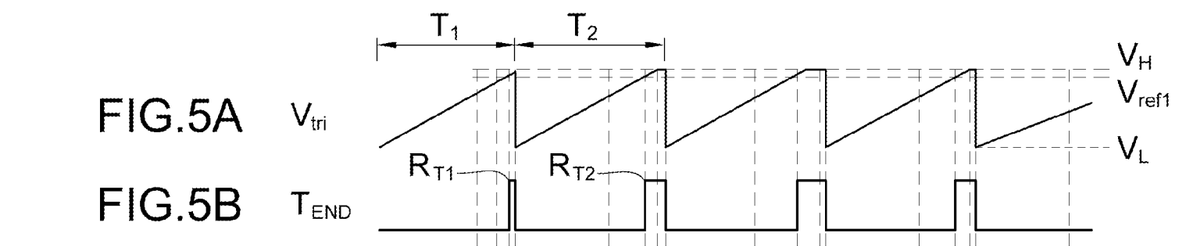
FIGS. 5A to 5G are relative timing waveform diagrams of each terminal of a synchronous timing pulse generation circuit according to an embodiment of the present invention.
Figure 5C:
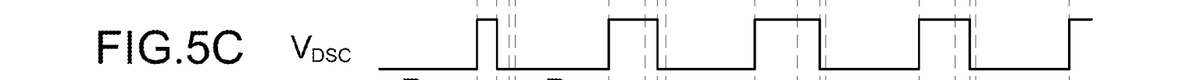
Figure 5D:
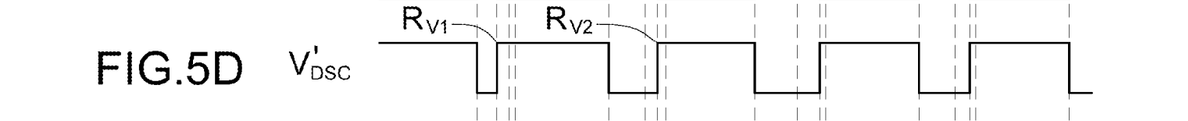
Figure 5E:
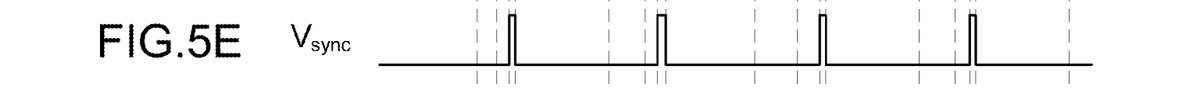

After receiving the indication signal $V_{tri}$, the comparator 310 compares the indication signal $V_{tri}$ with a reference voltage $V_{ref1}$, and accordingly outputs the timing pulse signal $T_{END}$. The high level voltage value $V_H$, the low level voltage value $V_L$, and the reference voltage $V_{ref1}$ can also be designed in a self actuated way depending on a practical circuit specification. FIGS. 5A and 5B are relative timing waveform diagrams of an indication signal $V_{tri}$ and a timing pulse signal $T_{END}$, which illustrates the operations of an embodiment in which a high level voltage value $V_H$ is larger than a reference voltage $V_{ref1}$. However, the reference voltage $V_{ref1}$ and the high level voltage value $V_H$ can also be equal depending on presetting of a user, which is not used to limit the scope of the present invention.

Figure 6A:
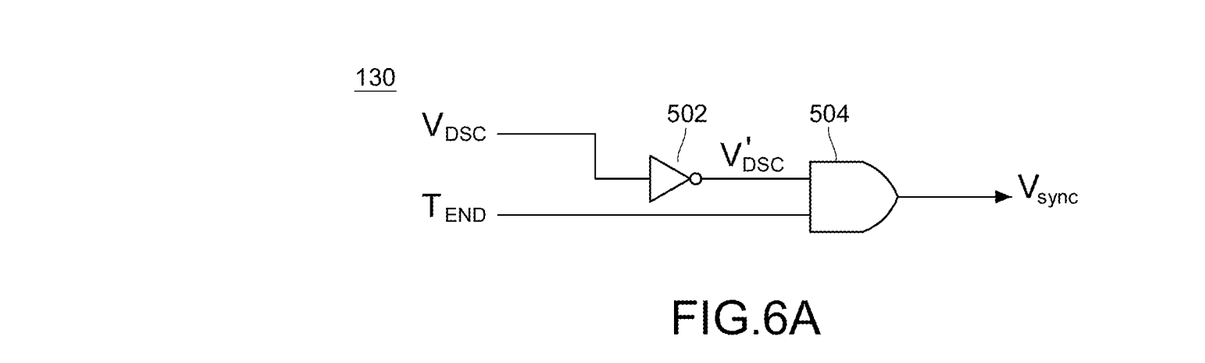
FIG. 6A is an internal circuit arrangement diagram of a synchronization control unit according to an embodiment of the present invention.

FIG. 6A is a function block diagram of a synchronization control unit according to an embodiment of the present invention. A synchronization control unit 130 comprises an inverter 502 and an AND logic gate 504. The inverter 502 receives the discharging time signal $V_{DSC}$, and outputs an inverse discharging time signal $V'_{DSC}$ after inverting the discharging time signal $V_{DSC}$. Two input terminals of the AND logic gate 504 receive the inverse discharging time signal $V'_{DSC}$ and the timing pulse signal $T_{END}$ respectively, and accordingly output the starting pulse $V_{sync}$. Relative timing waveform diagrams of the discharging time signal $V_{DSC}$, the inverse discharging time signal $V'_{DSC}$, the timing pulse signal $T_{END}$, and the starting pulse $V_{sync}$, are illustrated in FIGS. 5B to 5E.

Accordingly, in other words, only when both the inverse discharging time signal $V'_{DSC}$ and the timing pulse signal $T_{END}$ are at a high level, the AND logic gate 504 enables the starting pulse $V_{sync}$ to a high level. Hence, a triggering time of the starting pulse $V_{sync}$ can be synchronized to either the timing pulse signal $T_{END}$ or the inverse discharging time signal $V'_{DSC}$.

More specifically, taking a first period $T_1$ as an example, when a rising edge $R_{T1}$ of the timing pulse signal $T_{END}$ occurs later than a rising edge $R_{V1}$ of the inverse discharging time signal $V'_{DSC}$, the triggering time of the starting pulse $V_{sync}$ is synchronized to the rising edge $R_{T1}$ of the timing pulse signal $T_{END}$ (that is, the later one). As for a second period $T_2$, even if a rising edge $R_{T2}$ of the timing pulse signal $T_{END}$ occurs earlier than a rising edge $R_{V2}$ of the inverse discharging time signal $V'_{DSC}$, the triggering time of the starting pulse $V_{sync}$ is synchronized to the rising edge $R_{V2}$ of the inverse discharging time signal $V'_{DSC}$ (that is, also the later one). It can be known from the foregoing that, in the synchronization control unit 130 according to an embodiment of the present invention, the triggering time of the starting pulse $V_{sync}$ can be selectively synchronized to one occurring later of the rising edge of the timing pulse signal $T_{END}$ and the rising edge of the inverse discharging time signal $V'_{DSC}$ (that is, a falling edge of the discharging time signal $V_{DSC}$) in the same period.

Figure 5F:
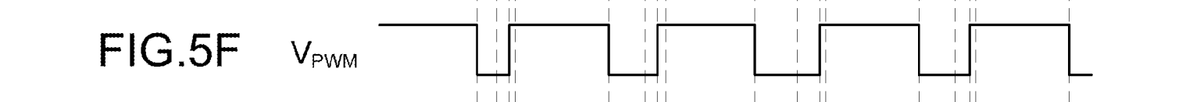

In view of the foregoing, the starting pulse $V_{sync}$ is used to determine a pulse starting time of the pulse-width-modulation signal $V_{PWM}$ (that is, the time when the pulse-width-modulation signal $V_{PWM}$ is switched to a high level), so as shown in FIG. 5F, the pulse starting time of the pulse-width-modulation signal $V_{PWM}$ can also be synchronized to one occurring later of the rising edge of the timing pulse signal $T_{END}$ and the rising edge of the inverse discharging time signal $V'_{DSC}$ in the same period, thereby achieving a purpose of modulating the pulse starting time of the pulse-width-modulation signal $V_{PWM}$.

Figure 5G:
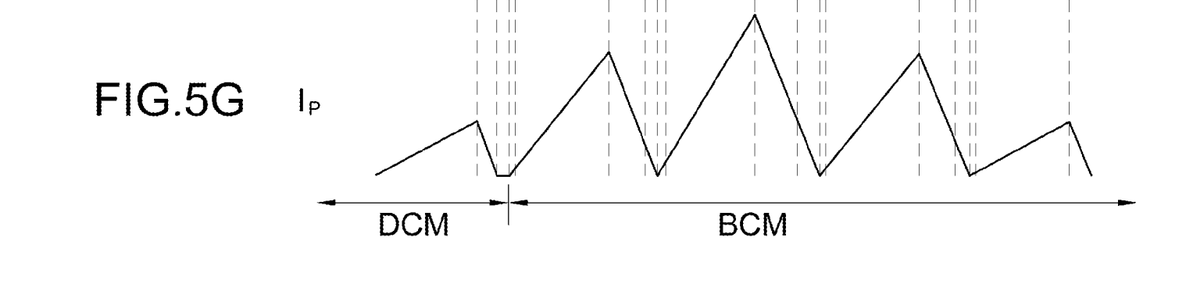

Referring to FIG. 2A, the high level and the low level of the pulse-width-modulation signal $V_{PWM}$ are used to switch the transistor SW, so as to control a power to be input or not input to the primary side 11 (that is, to generate or not generate the primary side switching current $I_P$). Hence, referring to FIGS. 5C, 5F, and 5G, during the first period $T_1$, even if the discharging time signal $V_{DSC}$ returns to the low level (that is, the secondary side switching current $I_S$ returns to the zero point), the primary side switching current $I_P$ is not formed immediately until the pulse-width-modulation signal $V_{PWM}$ is triggered, therefore forming a Discontinuous Conduction Mode (DCM) of the primary side switching current $I_P$.

Next, according to the embodiment of the present invention, referring to FIGS. 5A to 5G, after the second period $T_2$, the pulse starting time (that is, a triggering point of the starting pulse $V_{sync}$) of the pulse-width-modulation signal $V_{PWM}$ is adjusted to be synchronized to the falling edge of the discharging time signal $V_{DSC}$ (that is, the rising edge of the inverse discharging time signal $V'_{DSC}$). Hence, after discharging at the secondary side is accomplished, the switching power supply can effectively and immediately switches back to be charged at the primary side (to form the primary side switching current $I_P$), so as to form a Boundary Conduction Mode (BCM) and prevent the inductor current passing through the primary side winding $N_P$ from entering the CCM.

Figure 3C:
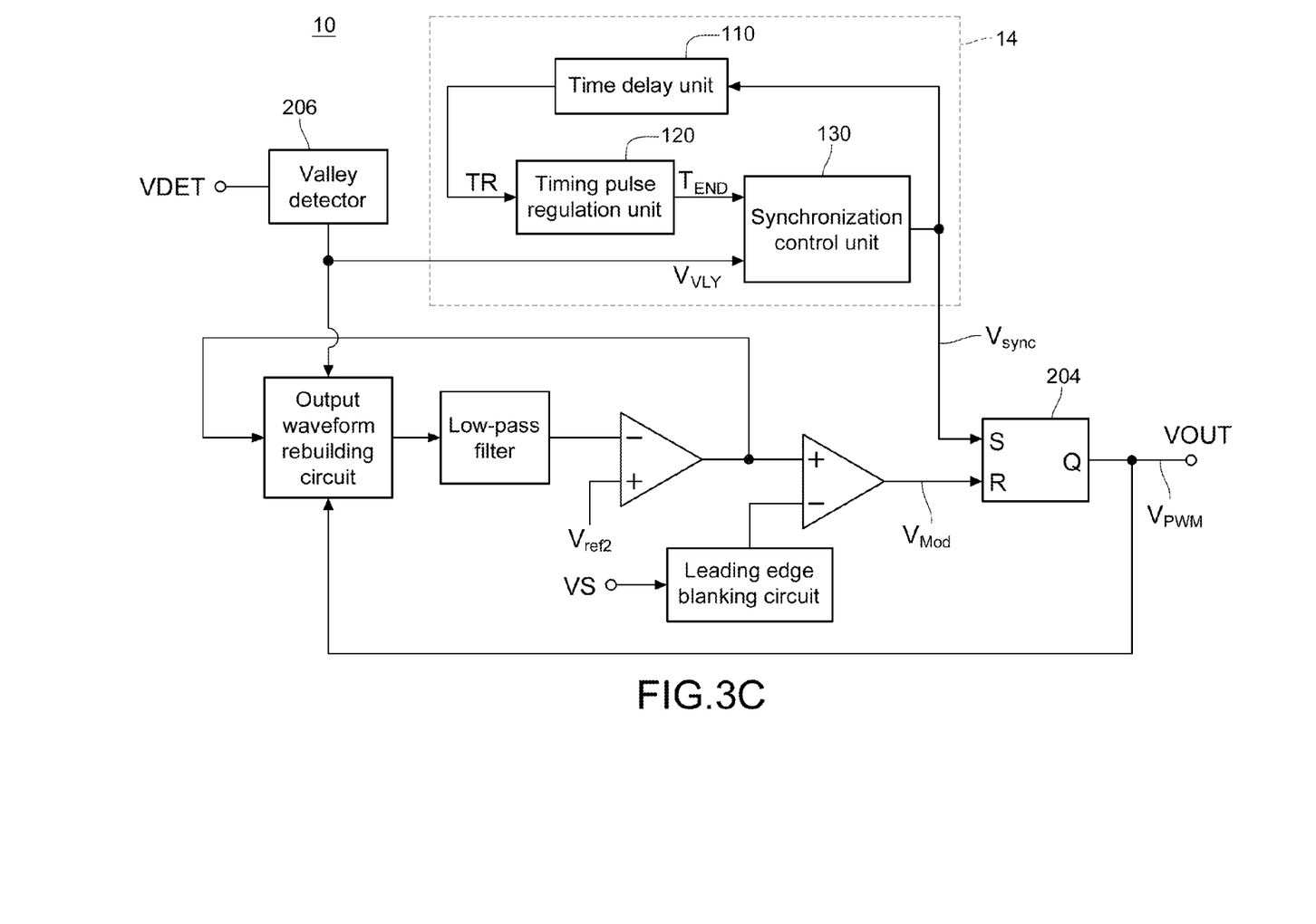
FIG. 3C is a circuit block diagram of a PSR according to another embodiment of the present invention.

Next, referring to FIGS. 2A and 3C, FIG. 3C is a circuit block diagram of a PSR according to another embodiment of the present invention. The discharging time detection terminal VDET can also be connected to a valley detector 206, and the valley detector 206 can detect the reflected voltage $V_W$ through the discharging time detection terminal VDET, and accordingly output a valley signal $V_{VLY}$, so as to determine the lowest point of resonance during turn-off interval of the transistor SW. Hence, the synchronous timing pulse generation circuit 14 can perform signal process of time delay, timing pulse regulation, and synchronization control according to the valley signal $V_{VLY}$ and the starting pulse $V_{sync}$, so as to modulate the pulse starting time of the pulse-width-modulation signal $V_{PWM}$ (that is, the starting pulse $V_{sync}$). The valley detector 206 is applied to the synchronous timing pulse generation circuit 14 according to the embodiment of the present invention, so as to not only achieve the purpose of modulating the starting pulse $V_{sync}$, but also reduce switching loss of the transistor SW (that is, the transistor SW is limited only to be conducted at its valley and thereby its highest frequency is also limited), and reduce electromagnetic interference (EMI) of the converter.

Figure 6B:
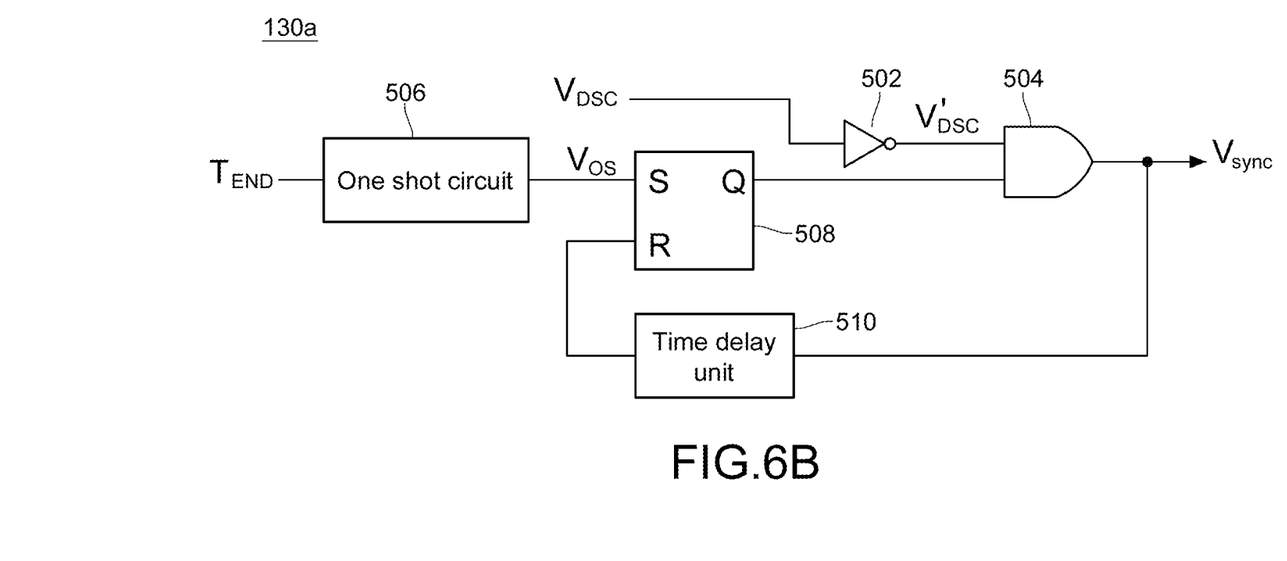
FIG. 6B is an internal circuit arrangement diagram of a synchronization control unit according to a second embodiment of the present invention.

FIG. 6B is an internal circuit arrangement diagram of a synchronization control unit according to a second embodiment of the present invention. Besides the inverter 502 and the AND logic gate 504, a synchronization control unit 130a can further comprise a one shot circuit 506, an SR flip-flop 508, and a time delay unit 510.

The one shot circuit 506 receives the timing pulse signal $T_{END}$, and accordingly converts it to obtain a one shot timing pulse signal $V_{OS}$. Two input terminals of the SR flip-flop 508 are connected to output terminals of the one shot circuit 506 and the time delay unit 510 respectively. The time delay unit 510 delays the starting pulse $V_{sync}$ for a predetermined time, and then outputs the delayed signal to the SR flip-flop 508. Hence, the SR flip-flop 508 receives the one shot timing pulse signal $V_{OS}$ and the starting pulse $V_{sync}$ after being delayed for the predetermined time, and accordingly generates the timing pulse signal $T_{END}$, so as to allow the AND logic gate 504 to accordingly output the starting pulse $V_{sync}$ subsequently.

Figure 7:
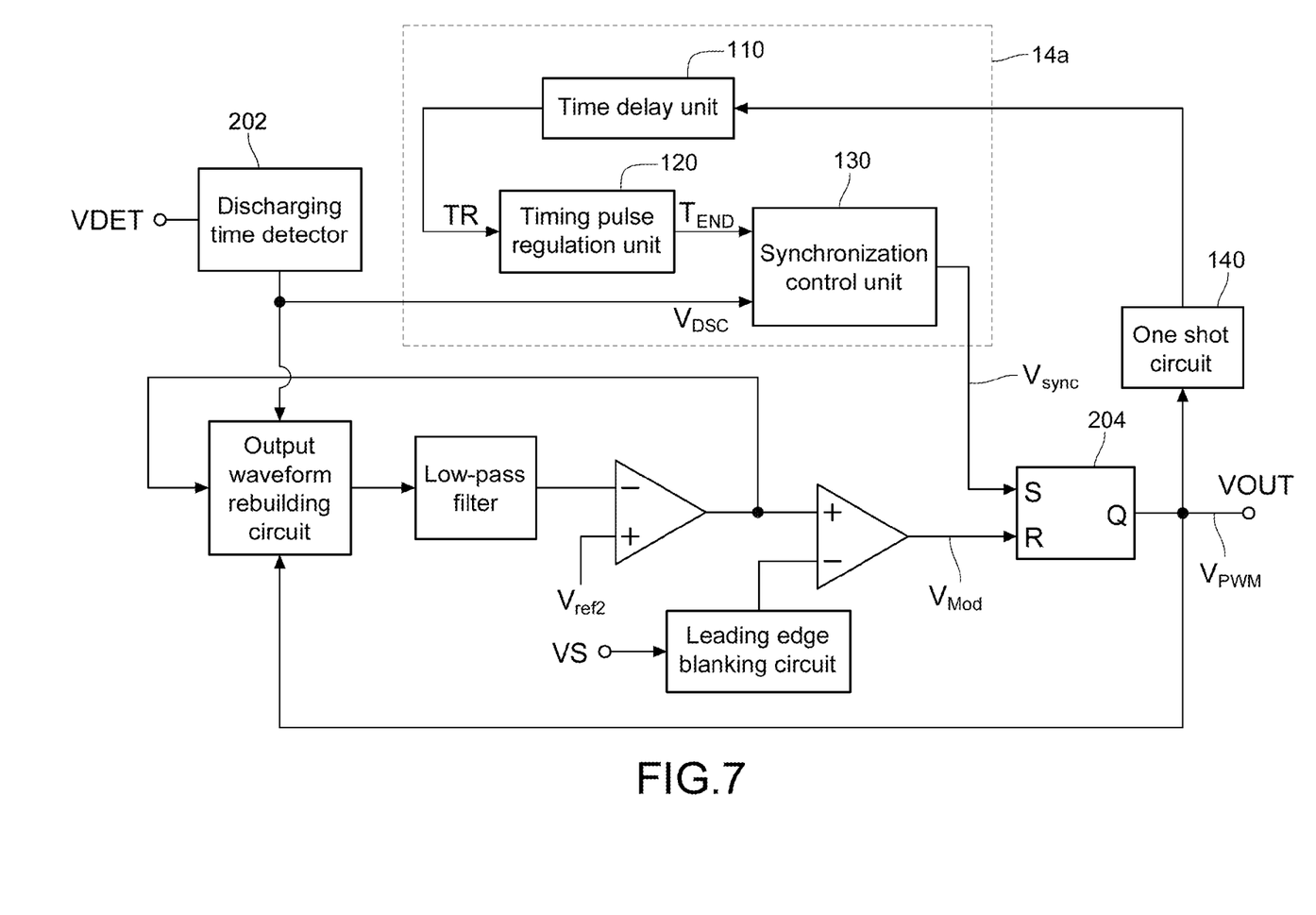
FIG. 7 is a circuit block diagram of a synchronous timing pulse generation circuit according to a third embodiment of the present invention.

Next, FIG. 7 is a circuit block diagram of a synchronous timing pulse generation circuit according to a third embodiment of the present invention. The starting pulse $V_{sync}$ received by the time delay unit 110 of a synchronous timing pulse generation circuit 14a can also be generated after a pulse-width-modulation signal $V_{PWM}$ processed by a one shot circuit 140. That is to say, a practical connection manner in which the time delay unit 110 is electrically connected to other external circuits is not used to limit the scope of the present invention. The cases in which according to the embodiment of the present invention, the time delay unit 110 receives the starting pulse $V_{sync}$ of the pulse-width-modulation signal $V_{PWM}$, so that a timing pulse regulation unit 120 and a synchronization control unit 130 perform subsequent signal process, so as to enable the starting pulse $V_{sync}$ to be synchronized to the later-occurring rising edge of either a timing pulse signal $T_{END}$ or an inverse discharging time signal $V'_{DSC}$ in the same period, without deteriorating the generality of the present invention.

Figure 8A:
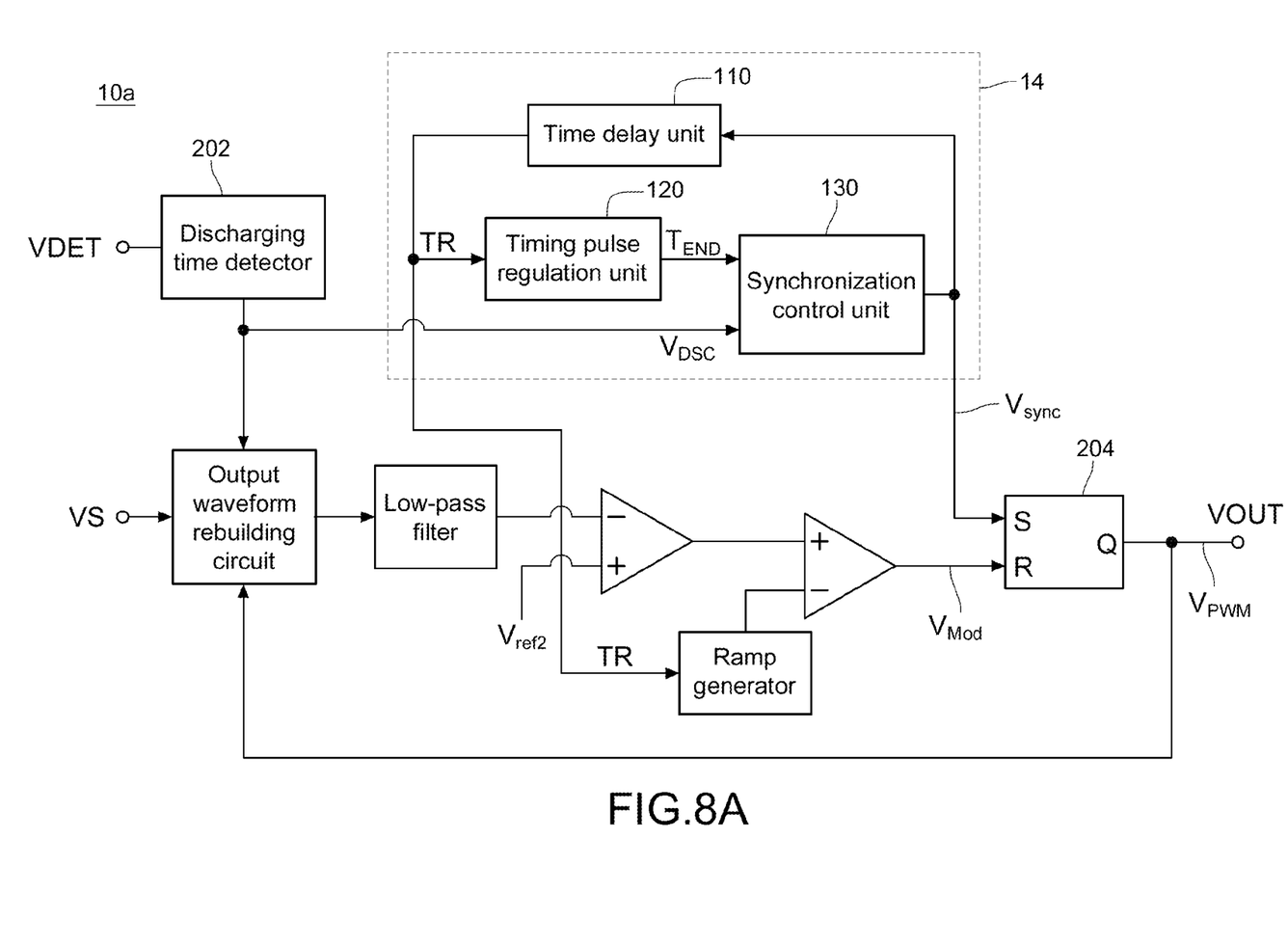
FIG. 8A is a circuit block diagram of an application architecture of a voltage mode control PSR including a synchronous timing pulse generation circuit according to a fourth embodiment of the present invention.
Figure 8B:
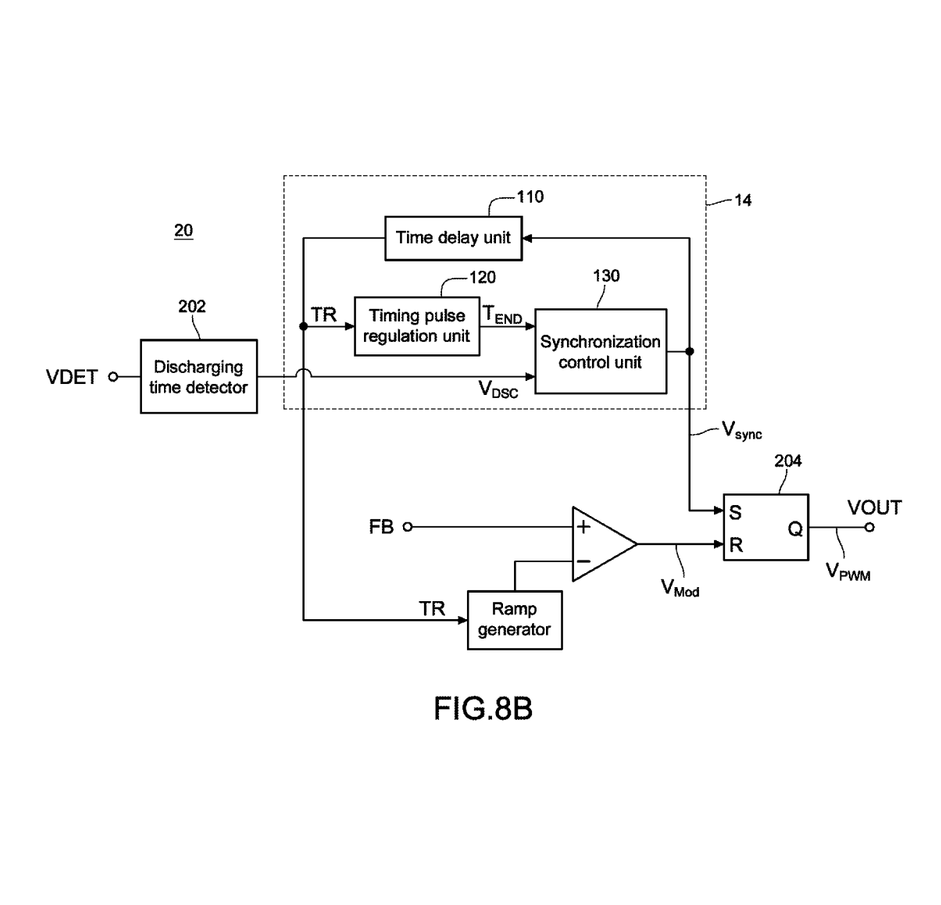
FIG. 8B is a circuit block diagram of an application architecture of a voltage mode SSR including a synchronous timing pulse generation circuit according to a fifth embodiment of the present invention.
Figure 8C:
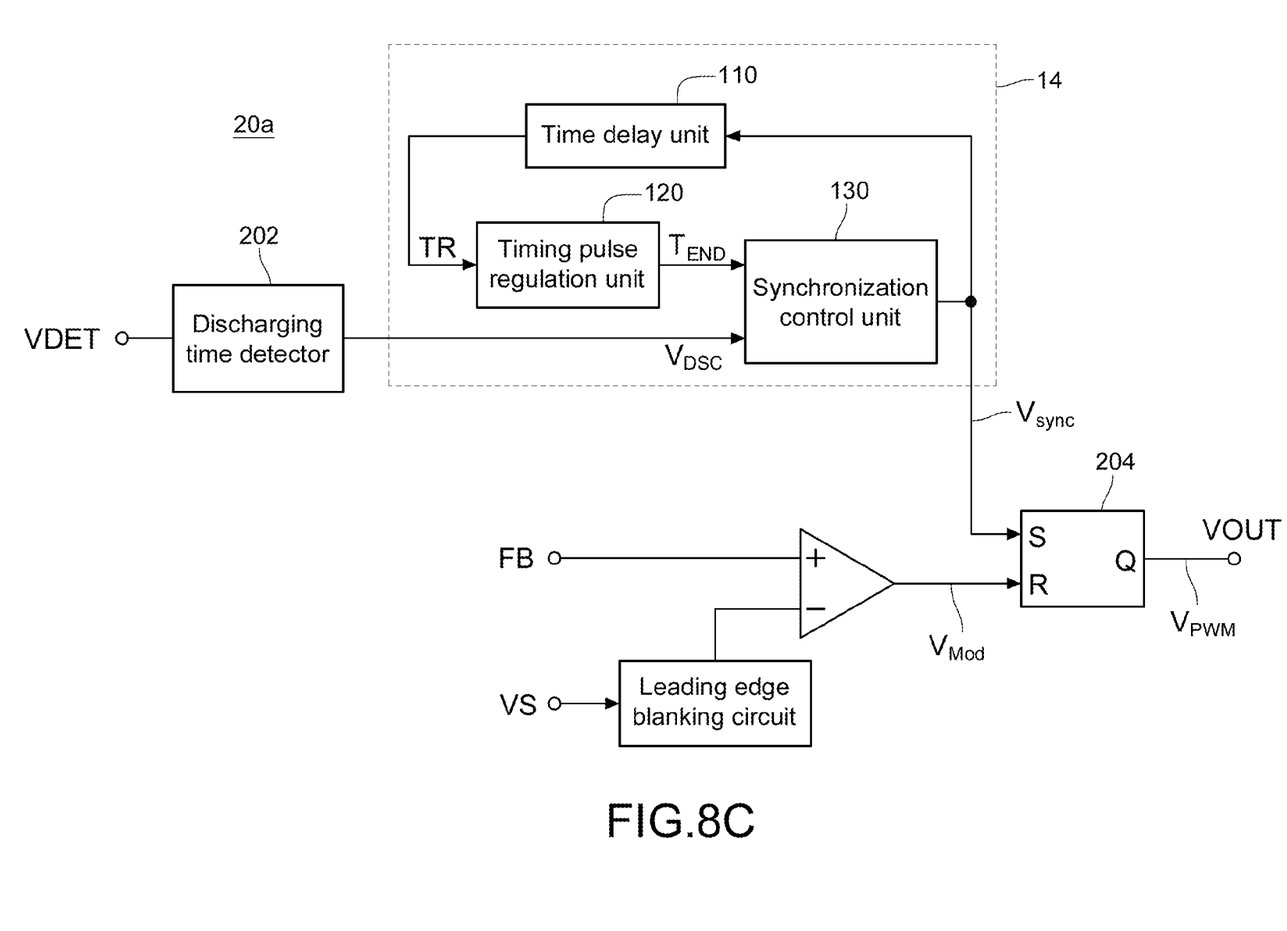
FIG. 8C is a circuit block diagram of an application architecture of a current mode SSR including a synchronous timing pulse generation circuit according to a sixth embodiment of the present invention.

FIG. 8A is a circuit block diagram of an application architecture of a voltage mode control PSR including a synchronous timing pulse generation circuit 14 according to a fourth embodiment of the present invention. FIGS. 8B and 8C are circuit block diagrams of a voltage mode control SSR and of a current mode control SSR including a synchronous timing pulse generation circuit 14 respectively according to a fifth embodiment and a sixth embodiment of the present invention. Thus, the synchronous timing pulse generation circuit according to the embodiment of the present invention can selectively be arranged in a PSR or a SSR without being limited to the constant voltage mode or constant current mode.

Next, the synchronous timing pulse generation circuit according to the embodiment of the present invention is applied to the circuit regulator of the switching power supply, so as to further control and output the pulse-width-modulation signal with the pulse starting time capable of being modulated, thereby preventing the inductor current of the switching power supply from entering the CCM.

What is claimed is:

1. A synchronous timing pulse generation circuit, applicable to a switching power supply, wherein the switching power supply has a primary side and a secondary side, the switching power supply enables a power to be selectively input or not input to the primary side through a pulse-width-modulation signal, the synchronous timing pulse generation circuit is used to generate a starting pulse of the pulse-width-modulation signal, the synchronous timing pulse generation circuit comprising:
   a time delay unit, for outputting a control signal after delaying the starting pulse for a predetermined time;
   a timing pulse regulation unit, for enabling a constant current source to selectively charge the timing pulse regulation unit according to the control signal, and accordingly outputting a timing pulse signal; and
   a synchronization control unit, for outputting the starting pulse according to a discharging time signal of the secondary side and the timing pulse signal, wherein the timing pulse signal has a rising edge, the discharging time signal has a falling edge, a triggering time of the starting pulse is synchronized to one occurring later of the rising edge of the timing pulse signal and the falling edge of the discharging time signal in the same period, and the starting pulse is used to determine a pulse starting time of the pulse-width-modulation signal.

2. The synchronous timing pulse generation circuit according to claim 1, wherein the timing pulse regulation unit comprises:
   a charging and discharging circuit, for outputting an indication signal according to the control signal and the constant current source; and
   a comparator, for comparing the indication signal with a reference voltage, and accordingly outputting the timing pulse signal.

3. The synchronous timing pulse generation circuit according to claim 2, wherein the charging and discharging circuit comprises:
   a capacitor, connected between the constant current source and a ground;
   a switch element, electrically connected between the capacitor and the ground, wherein ON or OFF of the switch element is controlled by the control signal, so as to control whether the constant current source charges the capacitor; and a level limiting circuit, for limiting a level of a signal output by the capacitor, so as to output the indication signal.

4. The synchronous timing pulse generation circuit according to claim 1, wherein the synchronization control unit comprises:

an inverter, for receiving the discharging time signal, and outputting an inverse discharging time signal; and an AND logic gate, for receiving the timing pulse signal and the inverse discharging time signal, and accordingly outputting the starting pulse.

5. The synchronous timing pulse generation circuit according to claim 4, wherein the synchronization control unit further comprises:

a one shot circuit, for receiving the timing pulse signal, and outputting a one shot timing pulse signal;

the time delay unit, for outputting the control signal after delaying the starting pulse for the predetermined time; and a flip-flop, for receiving the one shot timing pulse signal and the control signal, and accordingly outputting the timing pulse signal.

6. A circuit regulator, applicable to a switching power supply, wherein the switching power supply has a primary side and a secondary side, the switching power supply enables a power to be selectively input or not input to the primary side through a pulse-width-modulation signal, the circuit regulator comprising:

a pulse-width-modulation signal generation circuit, for outputting the pulse-width-modulation signal according to a primary side switching current signal of the primary side and a discharging time signal of the secondary side, wherein the pulse-width-modulation signal has a starting pulse; and a synchronous timing pulse generation circuit, for outputting the starting pulse after performing signal process of time delay, timing pulse regulation, and synchronization control on the pulse-width-modulation signal and the discharging time signal, wherein the starting pulse is used to determine a pulse starting time of the pulse-width-modulation signal.

7. The circuit regulator according to claim 6, wherein the synchronous timing pulse generation circuit comprises:

a time delay unit, for receiving the starting pulse, and outputting a control signal after delaying the starting pulse for a predetermined time;

a timing pulse regulation unit, for enabling a constant current source to selectively charge the timing pulse regulation unit according to the control signal, and accordingly outputting a timing pulse signal; and a synchronization control unit, for outputting the starting pulse according to the discharging time signal and the timing pulse signal, wherein the timing pulse signal has a rising edge, the discharging time signal has a falling edge, and a triggering time of the starting pulse is synchronized to one occurring later of the rising edge of the timing pulse signal and the falling edge of the discharging time signal in the same period.

8. The circuit regulator according to claim 7, wherein the timing pulse regulation unit comprises:

a charging and discharging circuit, for outputting an indication signal according to the control signal and the constant current source; and a comparator, for comparing the indication signal with a reference voltage, and accordingly outputting the timing pulse signal.

9. The circuit regulator according to claim 8, wherein the charging and discharging circuit comprises:

a capacitor, connected between the constant current source and a ground;

a switch element, electrically connected between the capacitor and the ground, wherein ON or OFF of the switch element is controlled by the control signal, so as to control whether the constant current source charges the capacitor; and a level limiting circuit, for limiting a level of a signal output by the capacitor, so as to output the indication signal.

10. The circuit regulator according to claim 7, wherein the synchronization control unit comprises:

an inverter, for receiving the discharging time signal, and outputting an inverse discharging time signal; and an AND logic gate, for receiving the timing pulse signal and the inverse discharging time signal, and accordingly outputting the starting pulse.

11. The circuit regulator according to claim 10, wherein the synchronization control unit further comprises:

a one shot circuit, for receiving the timing pulse signal, and outputting a one shot timing pulse signal;

the time delay unit, for outputting the control signal after delaying the starting pulse for the predetermined time; and a flip-flop, for receiving the one shot timing pulse signal and the control signal, and accordingly outputting the timing pulse signal.

* * * * *